(12) United States Patent
Kishi

(10) Patent No.: US 6,437,913 B1
(45) Date of Patent: Aug. 20, 2002

(54) LASER MICROSCOPE

(75) Inventor: Yosuke Kishi, Yokohama (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/525,165

(22) Filed: Mar. 14, 2000

(30) Foreign Application Priority Data

Mar. 18, 1999 (JP) .......................................... 11-073572
Mar. 6, 2000 (JP) ...................................... 2000-060577

(51) Int. Cl.⁷ .......................... G02B 21/06; G02B 21/00
(52) U.S. Cl. ........................ 359/389; 359/363; 359/368; 359/385
(58) Field of Search ................................ 359/368–390, 359/363, 350, 361

(56) References Cited

U.S. PATENT DOCUMENTS

| | | | |
|---|---|---|---|
| 5,138,486 A | * | 8/1992 | Meyer et al. ................ 359/363 |
| 5,371,624 A | * | 12/1994 | Nagano et al. .............. 359/368 |
| 5,535,052 A | * | 7/1996 | Jorgens ....................... 359/385 |
| 5,633,752 A | * | 5/1997 | Tsuchiya et al. ............. 359/389 |
| 5,760,951 A | * | 6/1998 | Dixon et al. |
| 5,777,783 A | * | 7/1998 | Endou et al. ................ 359/385 |
| 5,780,857 A | * | 7/1998 | Harju et al. |
| 5,870,222 A | * | 2/1999 | Yamamoto et al. .......... 359/368 |
| 6,094,300 A | * | 7/2000 | Kashima et al. ............. 359/385 |
| 6,167,173 A | * | 12/2000 | Schoeppe et al. ............ 359/368 |

* cited by examiner

*Primary Examiner*—Thong Nguyen
(74) *Attorney, Agent, or Firm*—Frishauf, Holtz, Goodman & Chick, P.C.

(57) ABSTRACT

A laser microscope includes a laser light source for emitting a coherent light beam, a scanning optical system for scanning the light beam emitted from the laser light source, an objective lens for condensing the light beam from the scanning optical system in a sample, a plurality of optical path-dividing members, a switching mechanism for holding the optical path-dividing members such that the optical path-dividing members can be selectively inserted in the optical path, an incident-light illumination light source for emitting an incident-light illumination beam, an observation section for enabling light to be observed through the selected optical path-dividing member, and a detector for enabling light, which the sample emits upon irradiation of the coherent beam, to be observed through the selected optical path-dividing member.

14 Claims, 7 Drawing Sheets

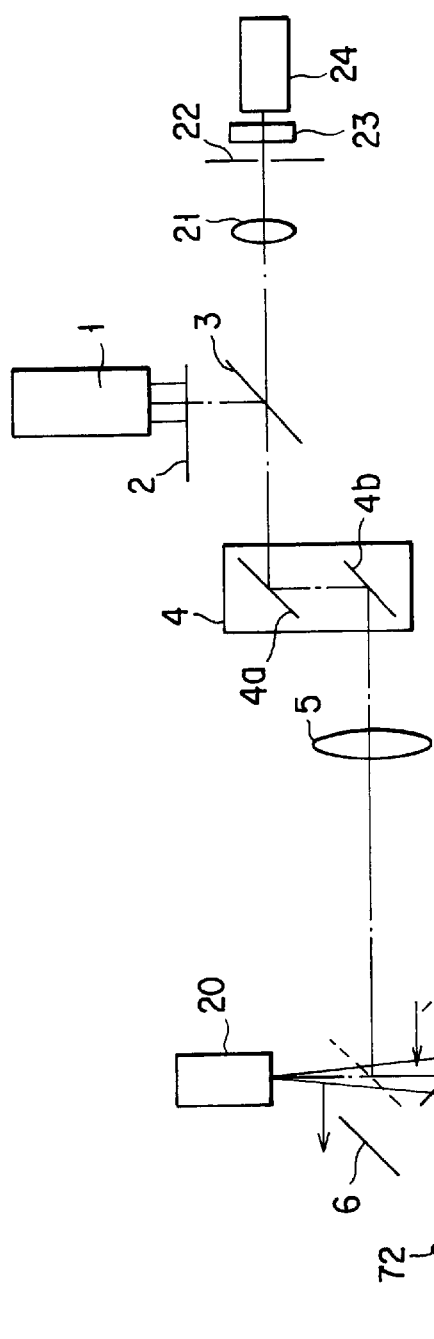
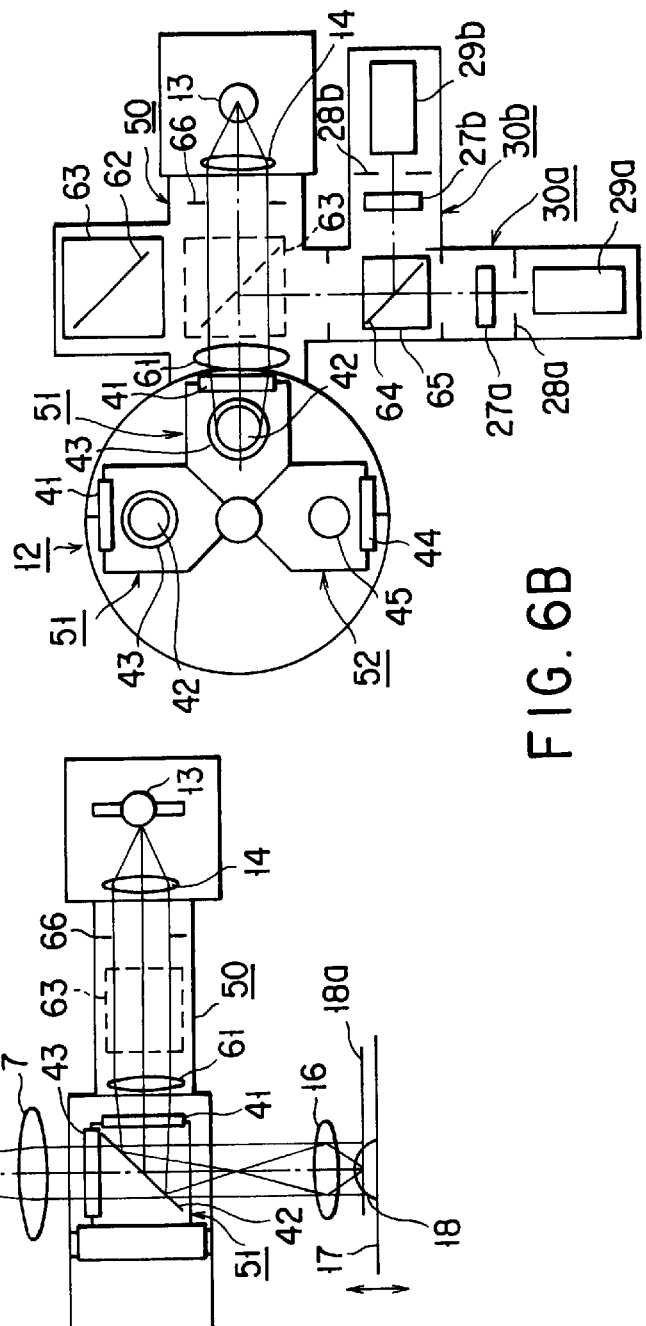
FIG. 6A
FIG. 6B

LASER MICROSCOPE

CROSS-REFERENCE TO RELATED APPLICATIONS

This application is based upon and claims the benefit of priority from the prior Japanese Patent Applications No. 11-073572, filed Mar. 18, 1999; and No. 2000-060577, filed Mar. 6, 2000, the entire contents of which are incorporated herein by reference.

BACKGROUND OF THE INVENTION

The present invention relates to a laser microscope.

As one type of laser microscope, a confocal laser microscope that enables incident-light illumination observation is known. In the confocal laser microscope, coherent light emitted from a laser light source is incident on a scanning optical unit. After being deflected by the scanning mirror of the scanning optical unit, the coherent light is made to fall on an objective lens by an image formation lens in such a way that the required pupil diameter is satisfied. The light transmitted through the objective lens is focused on a sample placed on a stage. As a result, the fluorescent indicator contained in the sample is excited and emits fluorescent light. This fluorescent light passes via the objective lens, the image formation lens, the scanning mirror, etc. and is then focused on the plane of a confocal pin hole. The fluorescent light penetrating the confocal pin hole passes through a photometric filter, by which the fluorescent wavelengths of the light are selected. Information on the fluorescent light are captured by a photoelectric transfer element, thereby obtaining a confocal image.

Before the confocal image is obtained by the confocal laser microscope, incident-light illumination observation is executed by means of incident-light illumination device, so as to confirm the position of the sample. In this case, a mirror unit is inserted between the image formation lens and the objective lens. A plurality of mirror units which are selected in accordance with the wavelength characteristics of fluorescent indicators are held on a turret. The mirror units are switched from one to another in accordance with the difference in the wavelength characteristics of the fluorescent indicator.

Excited light emitted from the excited-light source of the incident-light illumination device is incident on the mirror unit inserted in the optical path and holding both an excitation filter and a dichroic mirror. After wavelength selection and reflection by the mirror unit, the light passes through the objective lens and falls on the sample. The fluorescent light or reflected light from the sample passes through the objective lens again and is incident on an absorption filter. The reflected light is absorbed by this filter, and only the fluorescent wavelength components are selected. The fluorescent image of the sample is observed by means of an eyepiece or an imaging optical system.

In the confocal laser microscope of the above structure, the confocal image of a sample is captured by arranging a confocal pin hole at a position that is conjugate with reference to the focal plane of the sample. The fluorescent light from the sample excited by the laser light source is condensed by the objective lens. After passing by way of the image formation lens, the scanning optical unit, etc., the light forms an image on the plane of the confocal pin hole. The light from the confocal pin hole passes through the photometric filter and is then measured by the photoelectric transfer element. However, as long as the fluorescent light follows the optical path described above, it is reflected by a large number of elements and transmitted through a large number of elements, before it reaches the photoelectric transfer element. In other words, there is inevitably a certain degree of optical loss before the fluorescent light reaches the photoelectric transfer element. Hence, accurate fluorescent observation cannot be expected.

In recent years, a multiphoton laser microscope has been put to practical use, wherein the laser light source is made of an IR extremely-short pulse laser. In the multiphoton laser microscope, a multiphoton phenomenon is made to take place only in the focal plane of the sample irradiated with a beam from the IR extremely-short pulse laser. The multiphoton laser microscope can capture a sample image only in the focal plane by utilizing the multiphoton phenomenon to excite the fluorescent indicator and therefore to emit light. Owing to this feature, it is not unnecessary to employ a confocal pin hole, which is required in the conventional confocal laser microscope.

In the conventional confocal laser microscope having a multiphoton laser microscope function, however, fluorescent light emitted from a sample irradiated with an IR extremely-short pulse laser beam is detected by using a path similar to the detection path used by the confocal laser microscope. Due to this structure, the fluorescent light emitted from the sample is inevitably reflected or transmitted through a large number of optical members. In this manner, the fluorescent light weakens before it reaches the photoelectric transfer element, and high-accurate fluorescent observation cannot be executed.

In connection with this problem, the article "Nature", Vol. 385.9 January 1997, pp. 161–165 focuses on the elimination of the need to provide a confocal pin hole. Instead of the structure wherein the fluorescent light emitted from a sample is returned to the position of a confocal pin hole, the article discloses a structure wherein the fluorescent light is guided to a fluorescent detector from a mid-point of an optical path. However, the article merely discloses an illustration showing that the fluorescent light from the sample is guided to the fluorescent detector from the mid-point of the optical path, and does not specifically disclose anything regarding a specific structure or manner in which the fluorescent detector is provided. In particular, the article does not disclose a structure enabling the fluorescent detector to be installed with ease or enabling the existing fluorescent detector to be replaced with another. Given that a fluorescent light detection optical system is inserted in the optical path of the conventional laser microscope incorporating a confocal optical system, the confocal optical system may not work or fulfill its original performance.

BRIEF SUMMARY OF THE INVENTION

An object of the present invention is to provide a laser microscope that enables easy attachment and replacement of a detector used for detecting light emitted from a sample upon irradiation of coherent light.

To achieve this object, a laser microscope provided by the present invention comprises: a laser light source for emitting a coherent light beam; a scanning optical system for scanning the light beam emitted from the laser light source; an objective lens for condensing the light beam from the scanning optical system in a sample; a plurality of optical path-dividing members, interposed between the scanning optical system and the objective lens, for dividing an optical path of light emitted from the sample into a number of paths; a switching mechanism for holding the optical path-dividing members such that the optical path-dividing members can be selectively inserted in the optical path; an incident-light illumination light source for emitting an incident-light illumination beam; an observation section for enabling light, which the sample emits upon irradiation of the illumination beam, to be observed through the selected optical path-dividing member, the illumination beam being emitted from the incident-light illumination light source and guided to the sample by way of one of the optical path-dividing members selected by the switching mechanism; and a detector for enabling light, which the sample emits upon irradiation of the coherent beam, to be observed through the selected optical path-dividing member, the coherent beam being emitted from the laser light source and guided to the sample by way of one of the optical path-dividing members selected by the switching mechanism.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6A is a sectional side view showing the outline structure of a laser microscope according to the fourth embodiment of the present invention.

FIG. 6B is a sectional plan view showing the outline structure of an incident-light illumination device employed in the laser microscope.

DETAILED DESCRIPTION OF THE INVENTION

Figures 1A, 1B:
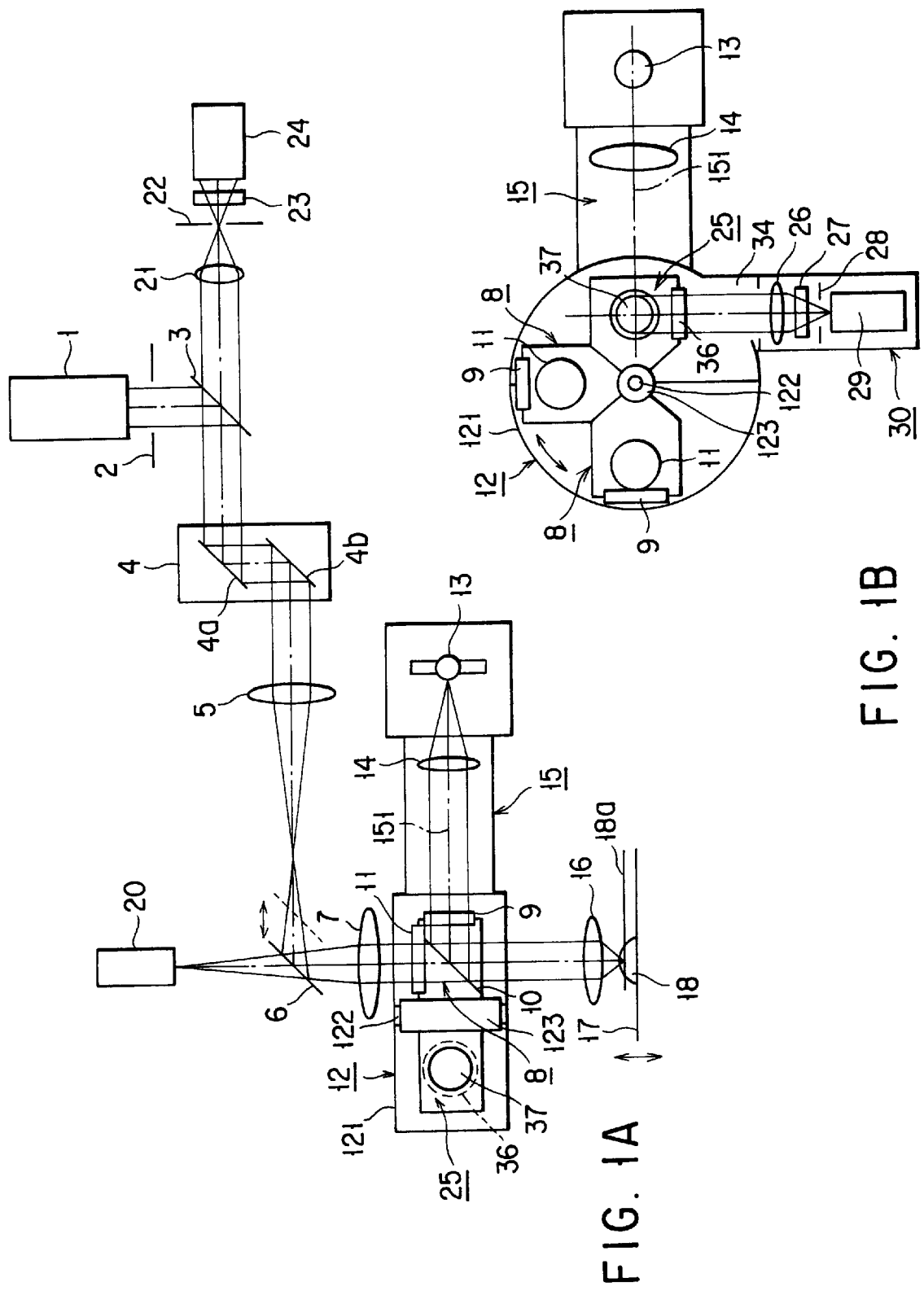
FIG. 1A is a sectional side view showing the outline structure of a laser microscope according to the first embodiment of the present invention.
FIG. 1B is a sectional plan view showing the outline structure of an incident-light illumination device employed in the laser microscope.

FIG. 1A is a sectional side view of a laser microscope according to the first embodiment of the present invention. FIG. 1B is a sectional plan view showing the outline structure of an incident-light illumination device employed in the laser microscope. In FIGS. 1A and 1B, the same structural elements are denoted by the same reference numerals. The laser microscope shown in FIGS. 1A and 1B is a confocal laser microscope enabling incident-light illumination observation.

The major portion of the laser microscope of the first embodiment will now be described. The laser light source 1 comprises two types of light sources: one is a type emitting an ordinary laser beam, and the other is a type for emitting an IR extremely-short pulse laser beam (an IR extremely-short pulse coherent beam). In the drawings, these two light sources are described as one, for simplicity. An incident-light illumination device 15 has an illumination system 151 in which a lens 14 is contained. The incident-light illumination device 15 is arranged close to the casing 121 of a turret 12, for which a mirror unit to be described later is provided. The incident-light illumination device 15 comprises an excitation light source 13, such as a mercury lamp or a xenon lamp. It also comprises a fluorescent detector 30. The detector 30 is arranged perpendicular to the illumination system 151. As shown in FIG. 1B, the fluorescent detector 30 includes a lens 26, a photometric filter 27, a shutter 28, and a photoelectric transfer element 29. It should be noted that the fluorescent detector 30 protrudes in front of the turret 12 in the diagram in FIG. 1A, i.e., it protrudes in the direction perpendicular to that in which the illumination system 151 having the excitation light source 13 and the lens 14 is arranged. For convenience of illustration, therefore, the fluorescent detector 30 is not shown in FIG. 1A.

The turret 12 of the incident-light illumination device 15 is located between an image formation lens 7 and an objective lens 16. It comprises a rotating member 123 arranged inside the casing 121 and rotatable on a shaft 122. The turret 12 contains a number of mirror units 8 for incident-light illumination observation (two units 8 in FIG. 1B), and at least one mirror unit 25 for fluorescent observation (one unit 25 in FIG. 1B). These mirror units are fixed to the circumference of the rotating member 123. The rotating member 123 of the turret 12 is designed to be freely revolvable by the operator, which operates a driving mechanism (not shown). In accordance with the revolution of the turret 12, one of the mirror units 8, 25 is selectively inserted in the optical path that connects the image formation lens 7 and objective lens 16 together (the optical path being indicated by the dot-and-dash line in the drawings). The casing 121 of the turret 12 has a hole at a predetermined position, so as to allow passage of a light beam. Each of mirror units 8 is provided with an excitation filter 9, a dichroic mirror 10, and an absorption filter 11. Mirror unit 25 is provided with an IR cut filter 36 and a dichroic mirror 37.

Figure 2:
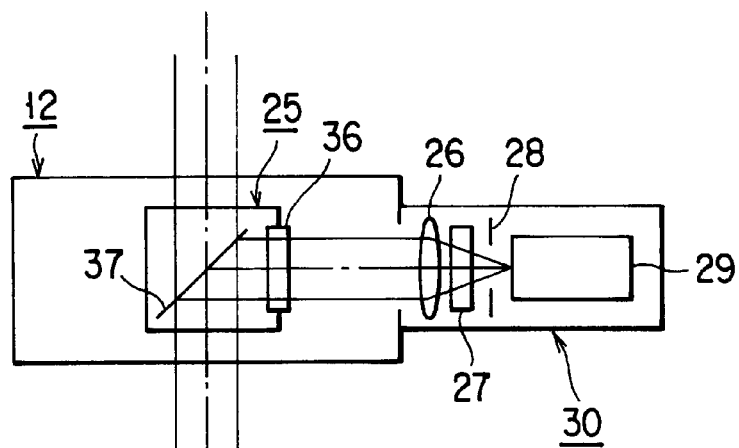
FIG. 2 is a sectional side view showing the outline structure of the fluorescent detector employed in the laser microscope described above.

FIG. 2 is a sectional side view schematically showing the fluorescent detector 30 employed in the laser microscope described above (the sectional view shows how the fluorescent detector 30 looks when it is looked at from a position depicted on the left side of FIGS. 1A and 1B). In FIG. 2, the same reference numerals as used in FIGS. 1A and 1B are used to indicate the same structural elements. As shown in FIG. 2, the mirror unit 25 is provided with the dichroic mirror 37 and the IR cut filter 36. The IR extremely-short pulse laser beam (the IR extremely short pulse coherent beam) from the laser light source 1 passes through the dichroic mirror 37, passes through the objective lens 16, and is then condensed on a section 18a of a sample 18 located on a stage 17. The fluorescent light emitted from the section 18a of the sample 18 first passes through the objective lens 16 and then falls on the dichroic mirror 37. The fluorescent light is reflected by the dichroic mirror 37 so that it is guided in a direction which is 90° with respect to the illumination system 151 of the incident-light illumination device 15. After the excitation light components are removed by the IR cut filter 36, the fluorescent light is incident on the fluorescent detector 30.

Figure 3:
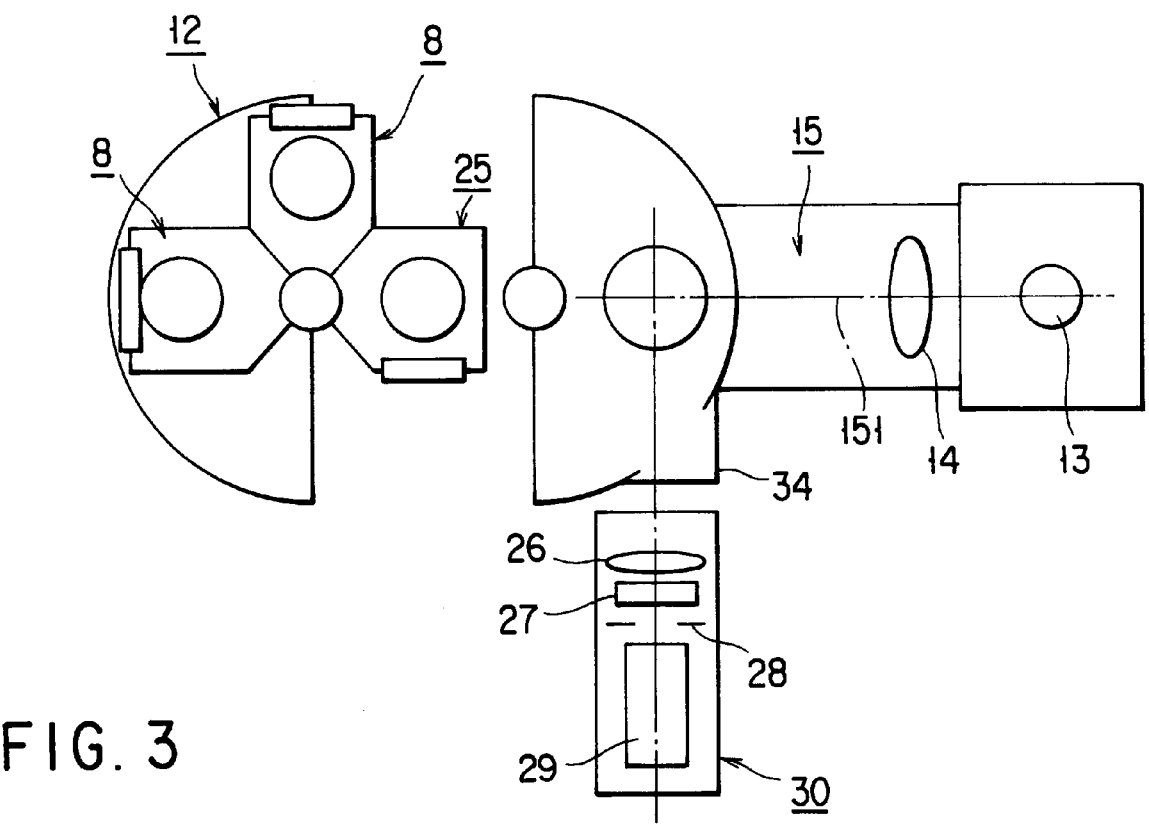
FIG. 3 is a sectional plan view schematically showing how the turret and the fluorescent detector of the laser microscope are assembled to the incident-light illumination device.

FIG. 3 is a sectional plan view schematically showing how the turret 12 and the fluorescent detector 30 of the laser microscope are assembled to the incident-light illumination device 15. In FIG. 3, the same reference numerals as used in FIGS. 1A, 1B and 2 are used to indicate the same structural elements. As shown in FIG. 3, the turret 12, comprising the mirror units 8 and 25, is attachable and detachable with reference to the incident-light illumination device 15. With this structure, the mirror units 8, 25 can be replaced with other desirable mirror units. In addition, since the fluorescent detector 30 can be attached and detached with reference to the incident-light illumination device 15 by means of a mount 34, the fluorescent detector 30 can be easily replaced.

A description will now be given of the operation of the laser microscope described above. First of all, incident-light illumination observation is performed so as to confirm the position of the sample 18. For this purpose, the operator revolves the turret 12 to arrange one of the mirror units 8 for incident-light illumination observation in the optical path, as shown in FIG. 1A. In this state, the excitation light emitted from the excitation light source 13 of the incident-light illumination device 15 passes through the lens 14 and is then incident on the excitation filter 9 of the mirror unit 8. After wavelength selection, the light is reflected by the dichroic mirror 10, transmitted through the objective lens 16, and condensed on the section 18a of the sample 18.

Upon irradiation of the light, the sample 18 reflects it or emits fluorescent light. The reflected or fluorescent light passes through the objective lens 16, and passes through the dichroic mirror 10. After the fluorescent wavelength components are selected by the absorption filter 11, the light is incident on the eyepiece (not shown) or an imaging optical element 20. A fluorescent image of the sample 18 is thus observed. It should be noted that during this observation, the mirror 6 is retracted from the optical path. Further, a shutter 2 is kept closed, and a laser beam emitted from the laser light source 1 is cut off.

Then, a confocal image of the sample 18 is obtained by the confocal laser scanning microscope using an ordinary laser beam. In this case, the operator opens the shutter 2, and the dichroic mirror 6 is inserted in the optical path. A laser beam emitted from the laser light source 1 passes through the open shutter 2 and is then reflected by a dichroic mirror 3. The reflected light is incident on a scanning optical unit 4. The scanning optical unit 4 contains a pair of scanning mirrors 4a and 4b which scan a light beam in directions orthogonal to each other. After being deflected by these mirrors 4a and 4b, the light passes through a relay lens 5, and is directed to the image formation lens 7 by the mirror 6. By the image formation lens 7, the light is made to fall on the objective lens 16 in such a way that the required pupil diameter of the objective lens 16 is satisfied. In this case, owing to the revolution of the turret 12 by the operator, none of the mirror units 8, 25 are inserted in the optical path between the image formation lens 7 and the objective lens 16.

After passing through the objective lens 16, the light is condensed on the section 18a of the sample 18. In response to the light, the fluorescent indicator 18a contained in the sample 18 is excited, thereby emitting fluorescent light. The fluorescent light passes by way of the objective lens 16, the image formation lens 7, the dichroic mirror 6, the relay lens 5, and the scanning mirrors 4b and 4a, and is then incident on the dichroic mirror 3. The fluorescent light passes through this dichroic mirror 3, and is focused on the surface of a confocal pin hole 22 by a lens 21. The fluorescent light penetrating the confocal pin hole 22 is then incident on a photometric filter 23, by which the fluorescent wavelength components are selected. The fluorescent light is captured by a photoelectric transfer element 24.

A sample image can be captured by the multiphoton laser scanning microscope using by causing the laser light source 1 to emit an IR extremely-short pulse laser beam (an IR extremely-short pulse coherent beam). In this case, the operator opens the shutter 2 and inserts the dichroic mirror 6 in the optical path. In addition, the operator revolves the turret 12 and insert mirror unit 25 for fluorescent observation in the optical path, as shown in FIG. 1B. The IR extremely-short pulse laser beam emitted from the laser light source in this state passes through the open shutter 2 and is then reflected by the dichroic mirror 3. The reflected light is incident on the scanning optical unit 4. After being deflected by scanning mirrors 4a and 4b of the scanning optical unit 4 (the scanning mirrors 4a and 4b scan a light beam in directions orthogonal to each other, as described above), the light passes through the relay lens 5, and is directed to the image formation lens 7 by the mirror 6. The light is made to pass via the dichroic mirror 37 of the mirror unit 25, and is made to fall on the objective lens 16 by the image formation lens 7 in such a way that the required pupil diameter of the objective lens 16 is satisfied.

The light transmitted through the objective lens 16 is condensed on the section 18a of the sample 18. In this case, a multiphoton phenomenon occurs only in the section 18a of the sample 18, i.e., the light-condensed plane of the sample 18, owing to the multiphoton excitation by the IR extremely-short pulse laser beam. As a result, the fluorescent indicator is excited, thereby emitting fluorescent light. The fluorescent light emitted from the section 18a of the sample 18 passes by way of the objective lens 16, and is then incident on the dichroic mirror 37 of the mirror unit 25, as shown in FIG. 2. The fluorescent light is reflected by the dichroic mirror 37 so that it is guided in a direction which is 90° with respect to the illumination system 151 of the incident-light illumination device 15. After the excitation light components are removed by the IR cut filter 36, the fluorescent light is incident on the fluorescent detector 30. Inside this fluorescent detector 30, the fluorescent light passes through the lens 26 and is incident on the photometric filter 27, by which the fluorescent wavelength components are selected. The fluorescent light is captured by the photoelectric transfer element 29 through the open shutter 28.

When the IR extremely-short pulse laser beam (an IR extremely-short pulse coherent beam) is scanned over the section 18a of the sample 18 by the scanning optical unit 4, the optical axis of the fluorescent light may deviate from the original position. To cope with this problem, the photoelectric transfer element 29 of the fluorescent detector 30 has a wide light-receiving area. With this structure, the fluorescent light emitted from the sample 18 can be captured without any loss.

According to the first embodiment, the fluorescent detector 30 is arranged close to the turret 12 of the incident-light illumination device 15. With this structure, the fluorescent light emitted from the sample 18 is subjected to a minimum degree of reflection and transmission. Since the loss of the fluorescent light captured by the fluorescent detector 30 is thus a minimum, it is possible to perform fluorescent observation with high accuracy. In addition, since the fluorescent detector 30 is attachable and detachable with reference to the incident-light illumination device 15, the operation for attaching and replacing the fluorescent detector can be easily performed.

The turret 12, located between the image formation lens 7 and the objective lens 16, contains two types of mirror units: the mirror units 8 for incident-light illumination observation and the mirror unit 25 for fluorescent observation. This structure is effective in reducing the space required for the fluorescent detector 30. In addition to the advantage that the required space can be minimum, the laser microscope can be small in size.

Figure 4:
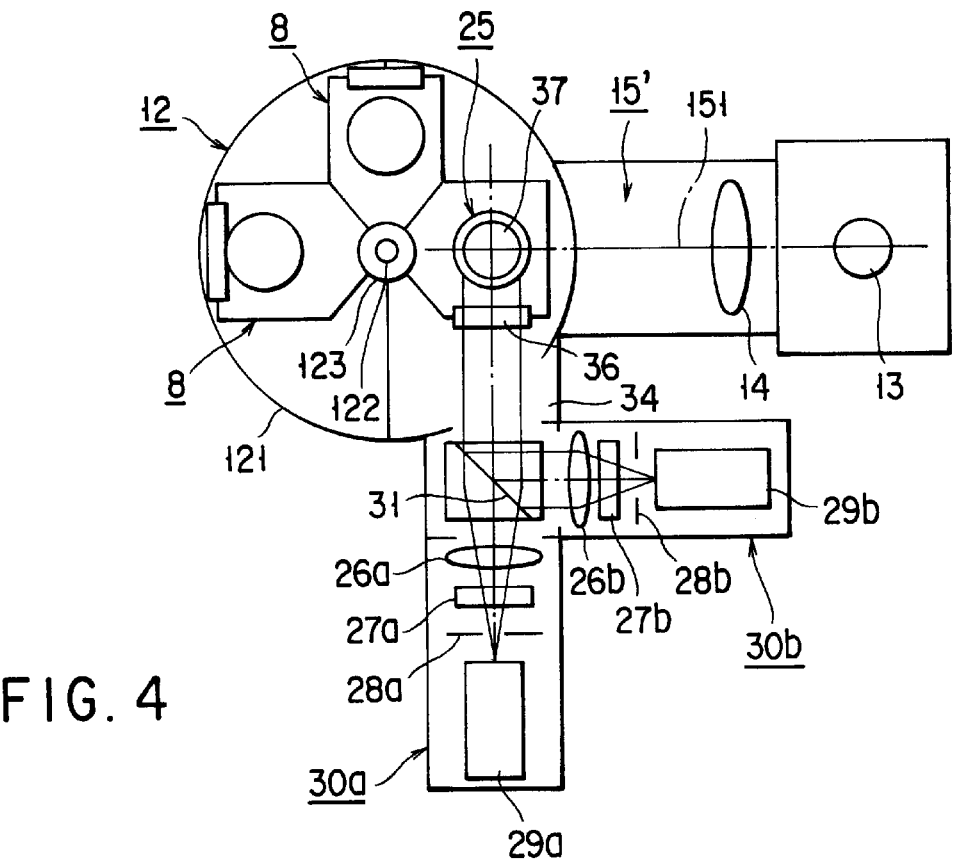
FIG. 4 is a sectional plan view showing the outline structure of an incident-light illumination device employed in a laser microscope according to the second embodiment of the present invention.

FIG. 4 is a sectional plan view showing the outline structure of an incident-light illumination device 15' employed in a laser microscope according to the second embodiment of the present invention. In FIG. 4, the same references as used in FIG. 1B are used to denote the same or corresponding structural elements.

In the first embodiment described above, the fluorescent light which the sample 18 emits upon irradiation of an IR extremely-short pulse laser beam (an IR extremely-short pulse coherent beam) is captured by one fluorescent detector 30. In the second embodiment, two fluorescent detectors are prepared for the fluorescent indicator since the fluorescent indicator is based on the ratio between two fluorescent wavelengths, like indo-1 (a calcium ion fluorescent indicator).

As shown in FIG. 4, an incident-light illumination device 15' has two fluorescent detectors 30a and 30b, and these detectors are arranged with a dichroic mirror 31 interposed. Fluorescent light which the sample 18 emits upon irradiation of an IR extremely-short pulse laser beam (an IR extremely-short pulse coherent beam) passes by way of an objective lens 16, a dichroic mirror 37 and an IR cut filter 36, and is then incident on a dichroic mirror 31. This dichroic mirror 31 splits the fluorescent light. The split light beams pass through the lenses 26a and 26b arranged inside the fluorescent detectors 30a and 30b and are then incident on photometric filters 27a and 27b, respectively. After the selection of fluorescent wavelengths, the light beams pass through open shutters 28a and 28b, and are captured by photoelectric transfer elements 29a and 29b, respectively.

With the above structure, a ratio image can be formed by calculating the ratio between the amounts of fluorescent light captured by the photoelectric transfer elements 29a and 29b arranged inside the two fluorescent detectors 30a and 30b.

Figure 5:
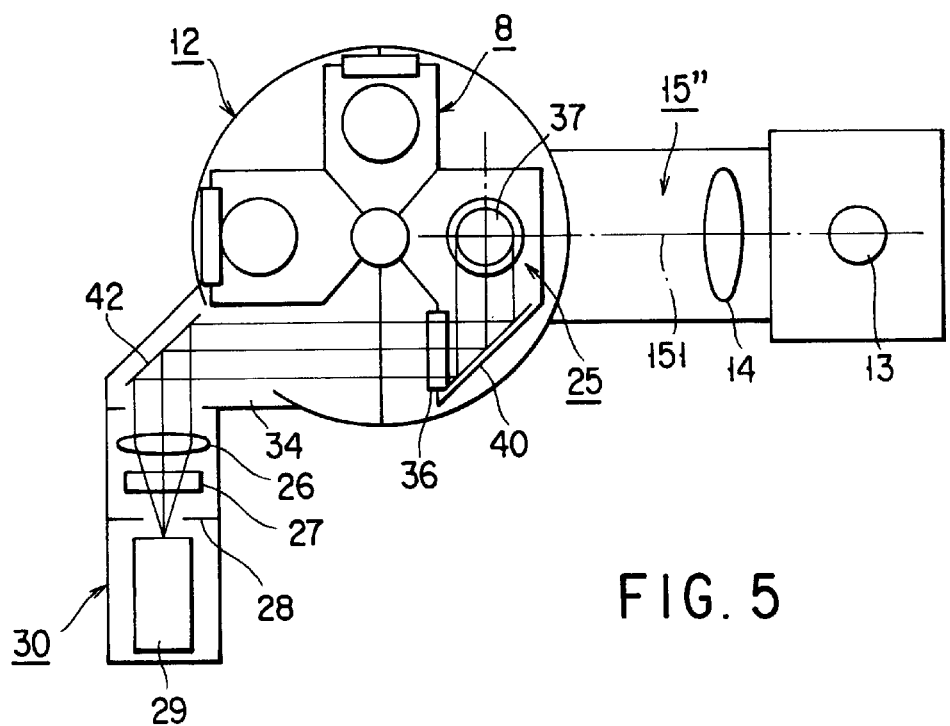
FIG. 5 is a sectional plan view showing the outline structure of an incident-light illumination device employed in a laser microscope according to the third embodiment of the present invention.

FIG. 5 is a sectional plan view showing the outline structure of an incident-light illumination device 15" employed in a laser microscope according to the third embodiment of the present invention. In FIG. 5, the same references as used in FIG. 1B are used to denote the same or corresponding structural elements.

According to the third embodiment, fluorescent light reflected by a dichroic mirror 37 of a mirror unit 25 is reflected by mirror 40. After passing through an IR cut filter 36, the fluorescent light is reflected by mirror 42. A fluorescent detector 30 is arranged on one side of a detachable turret 12. In the fluorescent detector 30, the fluorescent light passes through a lens 26 and is then incident on a photometric filter 27. After fluorescent wavelengths are selected by the photometric filter 27, the fluorescent light enters a photoelectric transfer element 29. It should be noted that the mirror 40 and the IR cut filter 36 are integral with the mirror unit 25, the mirror unit 25 can be rotated inside the turret 12 without any hindrance.

The above structure is very useful in the case where an incident-light illumination device is incorporated in a laser microscope and cannot be easily detached therefrom for modification. Even in this case, the turret 12 can be detached, and the fluorescent detector 30 can be detached together with it. The structure of the third embodiment can be obtained by slightly modifying the structure of the first or second embodiment, and yet enables easy attachment and detachment of the fluorescent detector 30.

Figures 7A, 7B:
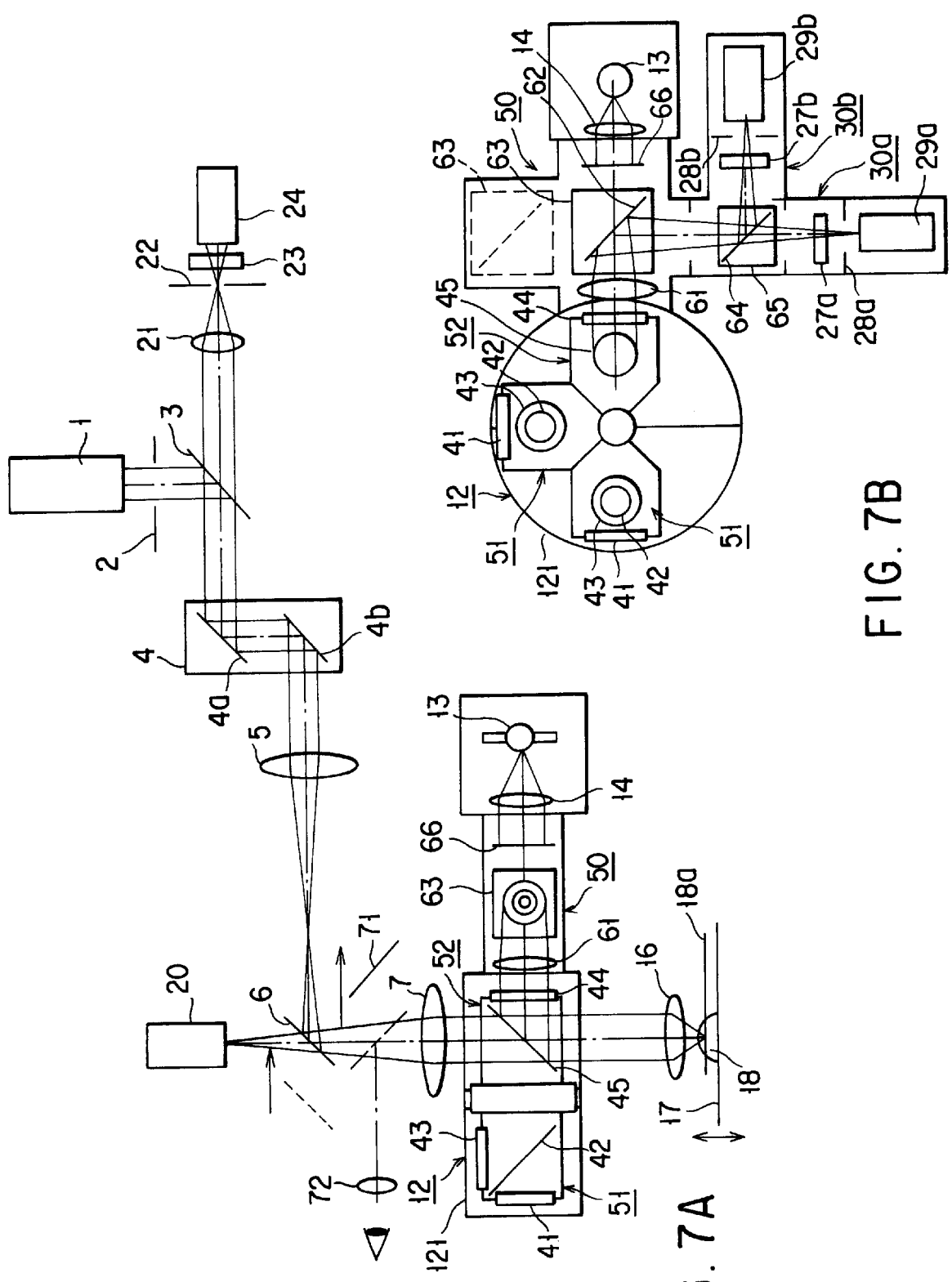
FIG. 7A is a sectional side view showing the outline structure of the laser microscope.
FIG. 7B is a sectional plan view showing the outline structure of the incident-light illumination device employed in the laser microscope.

FIG. 6A is a sectional side view showing the outline structure of a laser microscope according to the fourth embodiment of the present invention. FIG. 6B is a sectional plan view showing the outline structure of an incident-light illumination device employed in the laser microscope. Likewise, FIG. 7A is a sectional side view showing the outline structure of the laser microscope, and FIG. 7B is a sectional plan view showing the outline structure of the incident-light illumination device employed in the laser microscope. In FIGS. 6A, 6B, 7A and 7B, the same or corresponding structural components are denoted by the same reference numerals as used in FIGS. 1A, 1B and 2–5. The laser microscope shown in FIGS. 6A, 6B, 7A and 7B is a confocal laser microscope enabling incident-light illumination observation.

The major portion of the laser microscope of the fourth embodiment will be described. According to the laser microscope as well, a fluorescent image of a sample is observed by incident-light illumination so as to confirm the position of the sample. For this observation, the incident-light illumination device 50 comprises an excitation light source 13, such as a mercury lamp or a xenon lamp. Hence, a sample 18 can be excited by utilization of various wavelengths. In accordance with the characteristics of the fluorescent indicator contained in the sample 18, an excitation filter, an excitation dichroic mirror and an absorption filter must be suitably selected. For this purpose, a number of mirror units 51 (two units are shown in FIG. 7B), each made up of an excitation filter 41, an excitation dichroic mirror 42 and an absorption filter 43, are prepared for the wavelengths to be utilized.

These mirror units 51 are held on the turret 12, and can be easily switched from one to another in accordance with the wavelength characteristics of the fluorescent indicator.

A mirror unit 52, which is made up of an IR cut filter 44 and an excitation dichroic mirror 45, is also held on the turret 12. As described later, the fluorescent light emitted from the sample 18 is guided by the mirror unit 52 in directions approaching fluorescent detectors 30a and 30b. Since the turret 12 is attachable to and detachable from the incident-light illumination device 50, the mirror unit 12 can be easily detached for replacement.

The incident-light illumination device 50 is further provided with two mirror units 63 and 65. Mirror unit 63 is made up of a lens 61, a shutter 66 and a mirror 62, while mirror unit 65 includes a dichroic mirror 64. Mirror unit 63 can be inserted in the optical path or retracted therefrom by the operator when the operator operates a driving mechanism (not shown). According to the fourth embodiment, two fluorescent detectors 30a and 30b are prepared for the fluorescent indicator since the fluorescent indicator is based on the ratio between two fluorescent wavelengths, like indo-1 (a calcium ion fluorescent indicator). These fluorescent detectors 30a and 30b are provided for the incident-light illumination device 50.

A description will now be given of the operation of the laser microscope described above. First of all, incident-light illumination observation is performed so as to confirm the position of the sample 18. As shown in FIGS. 6A and 6B, the operator retracts the mirror unit 63 from the optical path and opens the shutter 66. By revolving the turret 12, the operator arranges one of the mirror units 51 for incident-light illumination observation in the optical path, as shown in FIGS. 6A and 6B. In this state, the excitation light emitted from the excitation light source 13 of the incident-light illumination device 50 passes through the lenses 14 and 61 and is then incident on the excitation filter 41 of the mirror unit 51. After wavelength selection, the light is reflected by the dichroic mirror 42, transmitted through the objective lens 16, and is condensed on the section 18a of the sample 18.

Upon irradiation of the light, the sample 18 reflects it or emits fluorescent light. The reflected or fluorescent light passes through the objective lens 16, and passes through the dichroic mirror 42. After the fluorescent wavelength components are selected by the absorption filter 43, the light is incident on the image formation lens 7. If the mirror 71 is inserted in the optical path by the operator, a fluorescent image of the sample 18 is formed in the eyepiece 72.

If both mirrors 6 and 71 are retracted from the optical path by the operator, the fluorescent image is formed on an imaging optical element 20. The fluorescent image of the sample 18 is observed in this manner. It should be noted that during this observation, the shutter 2 is kept closed, and the laser beam emitted from the laser light source 1 is cut off.

The operation of the confocal laser scanning microscope, which uses an ordinary laser beam, is similar to that of the first embodiment. A description of the operation will therefore be omitted.

Subsequently, a sample image is captured by the multiphoton laser scanning microscope using an IR extremely-short pulse laser beam (an IR extremely-short pulse coherent beam). In this case, the operator opens shutter 2 but keeps shutter 66 closed. In addition, the operator revolves the turret 12 in such a manner that the mirror units are changed from the state shown in FIG. 6B to the state shown in FIG. 7B. In other words, the operator arranges the mirror unit 52 in the optical path, so as to guide the fluorescent light to the fluorescent detectors 30a and 30b. The IR extremely-short pulse laser beam emitted from the laser light source 1 in this state passes through the open shutter 2 and is then reflected by the dichroic mirror 3. The reflected light is incident on the scanning optical unit 4. As shown in FIG. 7A, the light is deflected by scanning mirrors 4a and 4b of the scanning optical unit 4 (the scanning mirrors 4a and 4b scan a light beam in directions orthogonal to each other), and then passes through the relay lens 5, and is directed to the image formation lens 7 by the mirror 6. The light is made to pass via the dichroic mirror 45 of the mirror unit 52, and is made to fall on the objective lens 16 by the image formation lens 7 in such a way that the required pupil diameter of the objective lens is satisfied.

The light transmitted through the objective lens 16 is condensed on the section 18a of the sample 18. In this case, a multiphoton phenomenon occurs only in the section 18a of the sample 18, i.e., the light-condensed plane of the sample 18, owing to the multiphoton excitation by the IR extremely-short pulse laser beam. As a result, the fluorescent indicator is excited. The fluorescent light emitted from the section 18a of the sample 18 passes through the objective lens 16 once again, and is then incident on the dichroic mirror 45 of the mirror unit 52. The fluorescent light is reflected by the dichroic mirror 45. After the excitation light components, which are due to the IR extremely-short pulse laser beam, are removed by the IR cut filter 44, the fluorescent light passes though the lens 61. Then, the fluorescent light is reflected by the mirror 62 of the mirror unit 63, as shown in FIG. 7B. Further, the fluorescent light is split into two beams by the dichroic mirror 64 of the mirror unit 65. The two light beams are guided to the fluorescent detectors 30a and 30b, respectively. In the fluorescent detectors 30a and 30b, the light beams pass through the photometric filters 27a and 27b, respectively. After the selection of fluorescent wavelengths by these filters, the light beams pass through open shutters 28a and 28b, and are captured by photoelectric transfer elements 29a and 29b, respectively.

When the laser beam is scanned over the section 18a of the sample 18 by the scanning optical unit 4, the optical axis of the fluorescent light may deviate from the original position. However, since the photoelectric transfer elements 29a and 29b of the fluorescent detectors 30a and 30b have wide light-receiving areas, the fluorescent light emitted from the sample 18 can be captured without any loss.

According to the fourth embodiment, the fluorescent indicator is based on the ratio between two fluorescent wavelengths, like indo-1 (a calcium ion fluorescent indicator). To cope with such a fluorescent indicator, the fluorescent light beam is divided into light beams of different wavelengths by the dichroic mirror 64, and these light beams are measured by the photoelectric transfer elements 29a and 29b of the fluorescent detectors 30a and 30b, respectively. When the fluorescent indicator for the measurement of one-wavelength light is used, the operator retracts the mirror unit 65 from the optical path, so as to guide the fluorescent light only to the fluorescent detector 30a.

Figures 8A, 8B:
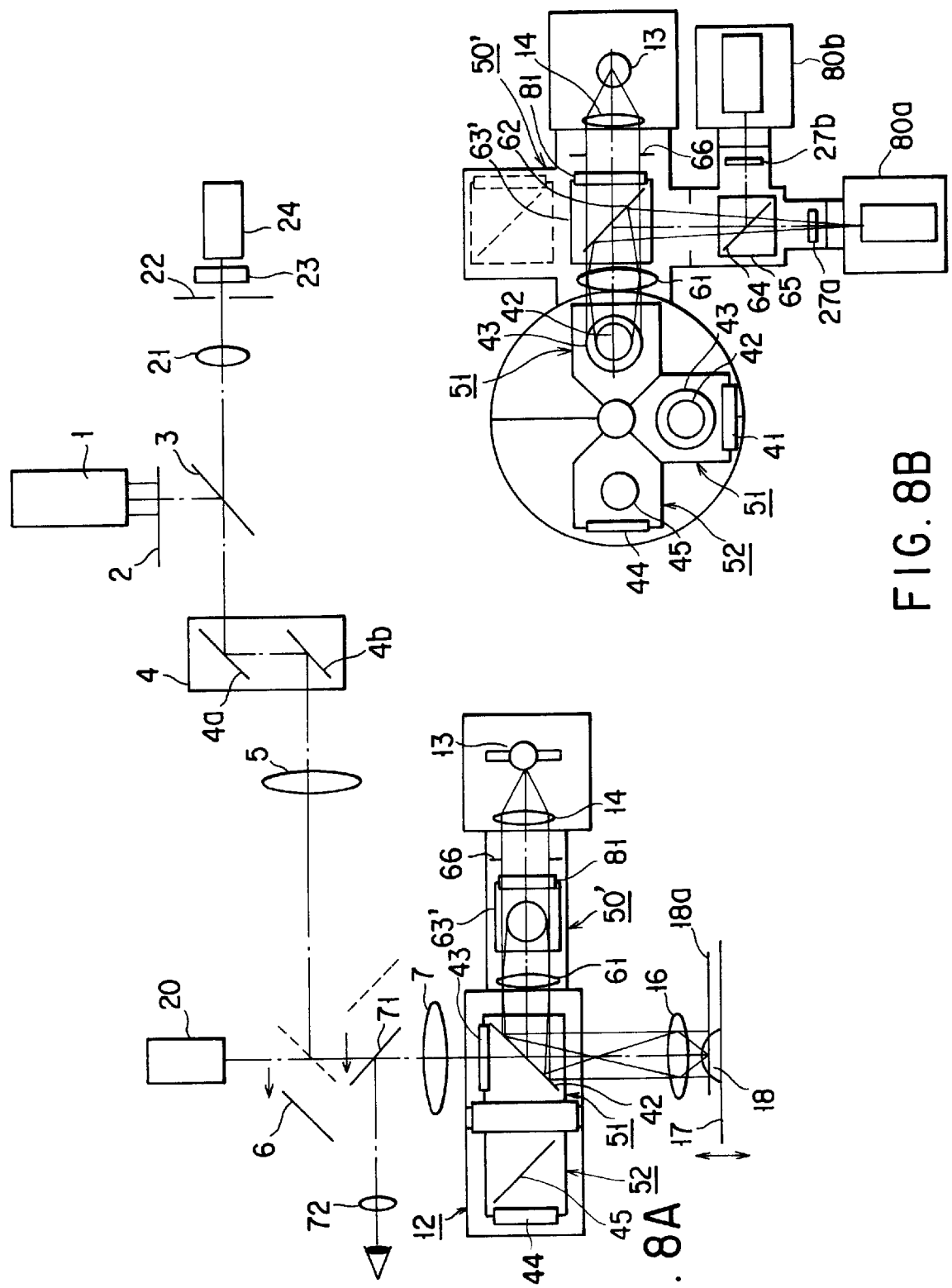
FIG. 8A is a sectional side view showing the outline structure of a laser microscope according to the fifth embodiment of the present invention.
FIG. 8B is a sectional plan-view showing the outline structure of an in incident-light illumination device employed in the laser microscope.

FIG. 8A is a sectional side view showing the outline structure of a laser microscope according to the fifth embodiment of the present invention. FIG. 8B is a sectional plan view showing the outline structure of an incident-light illumination device 15 employed in the laser microscope. In FIGS. 8A and 8B, the same or corresponding structural components are denoted by the same reference numerals as used in FIGS. 6A, 6B, 7A and 7B.

In the laser microscope of the fifth embodiment, a mirror unit 63', which comprises both an excitation filter 81 and a dichroic mirror 62, is inserted in the optical path of an incident-light illumination device 50'. In place of the fluorescent detectors 30a and 30b including photoelectric transfer elements 29a and 29b of the fourth embodiment, the laser microscope of the fifth embodiment employs CCD cameras 80a and 80b for fluorescent detection.

A description will now be given of the operation of the laser microscope of the fifth embodiment. The light emitted from the light source 13 passes through the lens 14 and is then incident on the excitation filter 81 of the mirror unit 63'. After wavelength selection, the light passes by way of the dichroic mirror 62 and the lens 61, is reflected by the dichroic mirror 42, and is then condensed on the section 18a of the sample 18.

In response to the light, the sample 18 emits fluorescent light. This fluorescent light passes through the objective lens 16 once again, is reflected by the dichroic mirror 42, passes through the lens 61, and is then reflected by the mirror 62 of the mirror unit 63'. Further, the fluorescent light is split into two beams by the dichroic mirror 64 of the mirror unit 65. The two light beams are guided to the photometric filters 27a and 27b, respectively. After the selection of fluorescent wavelengths by these filters, the light beams are captured by the CCD cameras 80a and 80b, respectively.

According to the fifth embodiment, the fluorescent indicator is based on the ratio between two fluorescent wavelengths, like indo-1 (a calcium ion fluorescent indicator). To cope with such a fluorescent indicator, the fluorescent light beam is divided into light beams of different wavelengths, and these light beams are captured by the CCD cameras 80a and 80b as images, respectively. Owing to this feature, a ratio image can be formed by calculation. When the fluorescent indicator for the measurement of one-wavelength light is used, the operator retracts the mirror unit 65 from the optical path, so as to guide the fluorescent light only to the CCD camera 80a for image acquisition.

Figure 9:
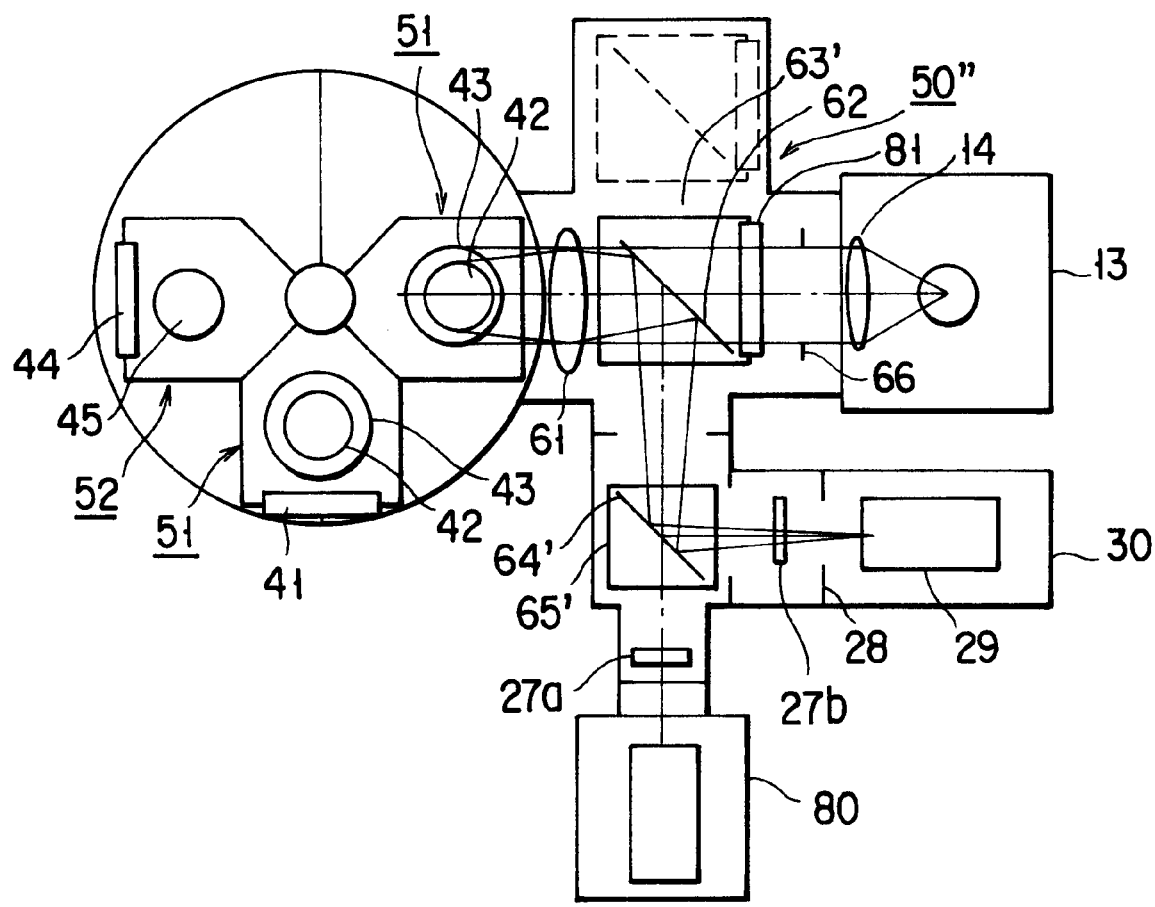
FIG. 9 is a sectional plan view showing the outline structure of a laser microscope according to the sixth embodiment.

FIG. 9 is a sectional plan view showing the outline structure of a laser microscope according to the sixth embodiment. In FIG. 9, the same or corresponding structural components are denoted by the same reference numerals as used in FIGS. 6B, 7B and 8B.

In the laser microscope of the sixth embodiment, a fluorescent detector 30 and a fluorescence-detecting CCD camera 80 are provided for a incident-light illumination device 50". The fluorescent detector 30 contains a shutter 28 and a photoelectric transfer element 29. A mirror unit 65' used in the embodiment includes a mirror 64'. Owing to this structure, fluorescent light can be guided to either the photoelectric transfer element 29 or the CCD camera 80 by merely inserting the mirror unit 65' in the optical path or retracting it from the optical path.

To be more specific, when the operator inserts the mirror unit 65' in the optical path, the fluorescent light is reflected by the mirror 64' of the mirror unit 65', so that the fluorescent light is guided only to the fluorescent detector 30. When the operator retracts the mirror unit 65' from the optical path, the fluorescent light is guided only to the CCD camera 80 for fluorescence detection, thus enabling acquisition of an image.

As described above, according to the present invention, the operation for attaching and replacing a fluorescent detector, which detects light emitted by a sample upon irradiation of an extremely-short pulse coherent beam, can be easily performed. According to the present invention, moreover, the light emitted by the sample upon irradiation of the extremely-short pulse coherent beam is guided to a detector by means of a single optical path-dividing member interposed between a scanning optical system and an objective lens. With this structure, the light emitted from the sample is subjected to reflection and transmission a minimum number of times before it is guided to the detector. Accordingly, the loss of the light can be a minimum.

According to the present invention, confocal laser microscope observation, multiphoton laser microscope observation and incident-light illumination observation are enabled. In addition, the structure of the present invention can be realized by utilizing part of a confocal optical system, and can therefore be manufactured at lost cost. Moreover, even where a device, such as a manipulation device with which to handle a sample, is installed around the microscope of the present invention, the installation and the manual operation are not hindered.

The present invention is not limited to the above embodiments, and can be modified in various ways without departing from the spirit and scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A laser microscope comprising:

a laser light source for emitting a coherent light beam;

a scanning optical system for scanning the light beam emitted from the laser light source;

an objective lens for condensing the light beam from the scanning optical system in a sample;

a plurality of optical path-dividing members, selectively interposed between the scanning optical system and the objective lens, for dividing an optical path of light emitted from the sample into a number of paths;

a switching mechanism for holding the optical path-dividing members such that one of the optical path-dividing members is selectively inserted in the optical path;

an incident-light illumination light source for emitting an incident-light illumination beam;

an observation section for enabling light, which the sample emits upon irradiation of the illumination beam, to be observed through a first optical path-dividing member, which is one of said optical path-dividing members, said illumination beam being emitted from the incident-light illumination light source and guided to the sample by way of the first optical path-dividing member selected by the switching mechanism; and a detector for detecting light which the sample emits upon irradiation of the coherent beam, which passes through a second optical path-dividing member which is one of said optical path-dividing members, and which does not pass through the scanning optical system, said coherent beam being emitted from the laser light source and guided to the sample by way of the second optical path-dividing member selected by the switching mechanism.

2. A laser microscope according to claim 1, wherein the second optical path dividing member is a reflecting member arranged to guide the light, which the sample emits upon irradiation of the coherent beam, in a direction that is substantially orthogonal to an optical path along which the light-emitted from the sample travels and an optical path along which the illumination beam emitted from the incident-light illumination light source travels.

3. A laser microscope according to claim 1, wherein said coherent beam is an IR extremely-short pulse coherent beam.

4. A laser microscope according to claim 1, wherein said detector is an attachable/detachable type.

5. A laser microscope according to claim 1, wherein said switching mechanism constitutes an attachable/detachable unit together with the optical path-dividing members.

6. A laser microscope according to claim 1, further comprising:

an optical path-dividing element for dividing light, which comes from the optical path-dividing member inserted in the optical-path along which the light from the sample travels, into light beams; and detectors for detecting the light beams obtained by the optical path-dividing element, respectively.

7. A laser microscope according to claim 1, wherein:

said switching mechanism contains a reflecting member for reflecting light, which comes from the optical path-dividing member inserted in the optical path along which the light from the sample travels; and said detector is provided for the switching mechanism such that the detector detects light coming from the reflecting member.

8. A laser microscope according to claim 1, further comprising a mirror unit arranged in an optical path of the illumination beam, said mirror unit dividing light which comes from the optical path-dividing member inserted in the optical path along which the light from the sample travels.

9. A laser microscope according to claim 8, wherein said mirror unit is insertable in, and retractable from the optical path of the illumination beam.

10. A laser microscope according to claim 8, further comprising:

an optical path-dividing unit for dividing light, which comes from the mirror unit, into light beams; and detectors for detecting the light beams obtained by the optical path-dividing unit, respectively.

11. A laser microscope according to claim 10, wherein said detectors are CCD cameras, respectively.

12. A laser microscope according to claim 10, wherein said detectors are a fluorescent detector and a CCD camera, respectively.

13. A laser microscope for enabling observation of a sample by use of an incident-light illumination beam, comprising:

a laser light source which emits a coherent light beam;

a scanning optical system which scans the light beam emitted from the laser light source;

an objective lens which condenses the light beam from the scanning optical system in a sample;

a switching mechanism which selectively positions a first optical path-dividing member in an optical path between the scanning optical system and the objective lens, said first optical path-dividing member reflecting incident-illumination light falling from an incident-illumination light source such that the reflected light is guided toward an optical path along which light from the sample travels;

a detector which detects the light emitted by the sample in accordance with a multiphoton phenomenon, the light being detected without using the scanning optical system; and a second optical path-dividing member which allows the coherent light beam from the scanning optical system to pass therethrough and which reflects the light from the sample such that the reflected light is guided to the detector without traversing the scanning optical system, said switching mechanism selectively positioning one of the first and second optical path-dividing members in the optical path along which the light from the sample travels.

14. A laser microscope according to claim 13, wherein said second optical path-dividing member enables the coherent light beam from the scanning optical system to pass straight therethrough to the sample.

* * * * *

UNITED STATES PATENT AND TRADEMARK OFFICE
CERTIFICATE OF CORRECTION

PATENT NO. : 6,437,913 B1
DATED : August 20, 2002
INVENTOR(S) : Yosuke Kishi

It is certified that error appears in the above-identified patent and that said Letters Patent is hereby corrected as shown below:

<u>Title page,</u>
Item [56], References Cited, U.S. PATENT DOCUMENTS, insert
-- 5,034,613   07/1991   Denk et al --
OTHER PUBLICATIONS, insert -- Article entitled "IN VIVO DENDRITIC CALCIUM DYNAMICS IN NEOCORTICAL PYRAMIDAL NEURONS" by K. Svoboda, et al, Nature, Vol. 385, January 9, 1997, pp. 161-165 --

Signed and Sealed this

Seventeenth Day of August, 2004

JON W. DUDAS
*Acting Director of the United States Patent and Trademark Office*